3,054,762
PROCESS FOR PREPARING EMULSION PAINTS BY POLYMERIZING MONOMER IN PRESENCE OF MONOMER
Richard W. Rees, Wilmington, Del., assignor to Shawinigan Chemicals Limited, West Montreal, Quebec, Canada, a corporation of Canada
No Drawing. Filed Dec. 29, 1958, Ser. No. 783,199
20 Claims. (Cl. 260—17)

This invention relates to pigmented coating compositions. More particularly, it relates to a new and improved process for preparing emulsion paints containing a resin component and prepared by polymerizing or copolymerizing a suitable polymerizable constituent in presence of the usual paint ingredients including the pigment dispersion. This invention also relates to the new aqueous emulsion paints produced thereby.

All resin emulsion paints, hereinafter referred to as latex paints, have two essential components: the binder dispersion and the pigment dispersion. The pigment dispersion, in latex paints, normally contains a prime pigment, an extender pigment, dispersing aids or wetting agents or both, and water. The binder dispersion, also termed the paint vehicle, may be any of a number of different polymer or copolymer latices, e.g. polystyrene, polyacrylic acid esters, polyvinyl esters. Usually a protective colloid is either added to the pigment dispersion or blended in the mixture of pigment and binder dispersions.

Attempts to polymerize the monomer in presence of the pigment dispersion and the other paint components to form a latex paint have met with failure in the past. Two of the reasons for this were that a long induction period in the polymerization of the monomer always occurred, and the ingredients usually coagulated when pigments were introduced into a conventional emulsion formulation prior to polymerization.

It is an object of this invention to prepare latex paints by effecting polymerization of monomers in presence of all other ingredients essential in making a paint, including the aqueous pigment dispersion, thus eliminating the step of blending the aqueous pigment dispersion into the emulsified polymer.

It is another object of this invention to prepare latex paints by effecting polymerization of monomers in liquid phase, starting with a reaction mixture at relatively low polymerization temperature, without the necessity of heating the mixture.

It has now been found that by using certain specific reduction activated catalyst systems in presence of appropriate proportions of an aqueous pigment dispersion and suitable monomers hereinafter enumerated, alone or in presence of other copolymerizable monomers, it is possible to reduce the induction period drastically, to eliminate pigment and polymer coagulation, and to prepare paints of small particle size and of improved gloss, water resistance, and pigment binding qualities.

The present invention thus consists in a process for preparing a pigmented coating composition having a pigment volume concentration (P.V.C.) of 8–80%, said process comprising (A) forming a mixture of (1) water, (2) a polymerizable constituent consisting essentially of a liquid of the group consisting of (a) one monomer selected from class I, (b) one monomer selected from class II, (c) two monomers selected from class I only, (d) two monomers selected from class II only, (e) two monomers, one being selected from class I only, and the other being selected from class III only, (3) an aqueous pigment dispersion, (4) a wetting agent, (5) a protective colloid, (6) a reduction activated catalyst system consisting of (a) an oxidizing agent consisting of a water-soluble salt of persulfuric acid, (b) at least one reducing agent consisting of a water-soluble compound of the group consisting of salts of oxyacids of sulfur having reducing properties and addition compounds of these salts with an aldehyde, (c) a catalyst activator consisting of a water-soluble iron salt, and (d) a sequestering agent capable of forming a complex with polyvalent iron cations, said class I consisting (a) vinyl esters of saturated aliphatic monocarboxylic acids having from two to four carbon atoms, (b) acrylic acid esters of saturated aliphatic monohydroxy alcohols having from one to four carbon atoms, (c) methacrylic acid esters of saturated aliphatic monohydroxy alcohols having from one to four carbon atoms, (d) acrylonitrile, and (e) vinylidene chloride, said class II consisting of (a) methacrylic acid esters of saturated aliphatic monohydroxy alcohols having from one to four carbon atoms, (b) acrylonitrile, (c) vinylidene chloride, (d) styrene, and (e) butadiene, said class III consisting of (a) vinyl esters of saturated aliphatic monocarboxylic acids having from five to eight carbon atoms, (b) acrylic acid esters of saturated aliphatic monohydroxy alcohols having from five to ten carbon atoms, (c) methacrylic acid esters of saturated aliphatic monohydroxy alcohols having from five to ten carbon atoms, (d) maleic acid diesters of saturated aliphatic monohydroxy alcohols having from one to ten carbon atoms, and (e) fumaric acid diesters of saturated aliphatic monohydroxy alcohols having from one to ten carbon atoms, (B) agitating said mixture at temperatures below the refluxing temperature of the mixture while polymerization of said polymerizable constituent and dispersion of the pigment in the resulting emulsion occur simultaneously, and (C) adjusting the proportion of polymerizable constituent in the mixture to form an aqueous pigment coating composition having a P.V.C. of between 8 and 80%.

The invention further consists in latex paints prepared according to said process.

As mentioned above, the polymerizable constituent can consist of a single polymerizable monomer, or it can consist of two copolymerizable monomers, selected from the classes of monomers as indicated; also the polymerizable constituent can consist essentially of one or two of the aforementioned monomers, as indicated, together with a minor proportion of one or more copolymerizable monomers which act, for example, as an internal plasticizer for the essential polymerizable constituent. The use of copolymerizable monomers as internal plasticizer in the polymerizable constituent removes the need for addition of external plasticizer to the paint composition after completion of the polymerization. With some pairs of copolymerizable monomers which can be used as the polymerizable constituent there is adequate self-internal plasticizing and no additional copolymerizable monomer nor external plasticizer is required.

Preferred examples in which the polymerizable constituent consists of two copolymerizable monomers selected from the classes of monomers as indicated, are: vinyl acetate-vinyl propionate, vinyl acetate-butyl acrylate, methyl acrylate-ethyl acrylate, butyl acrylate-acrylonitrile, styrene-butadiene, vinyl acetate-vinylidene chloride, butyl acrylate-vinylidene chloride, vinyl acetate-vinyl 2-ethyl hexoate, vinyl acetate-decyl acrylate, vinyl acetate-dibutyl fumarate, and vinyl acetate-di(2-ethyl hexyl) maleate.

For the catalyst system used in this invention, examples of water-soluble salts of persulfuric acid for use as oxidizing agents are sodium persulfate, potassium persulfate, and ammonium persulfate. The reducing agent is a water-soluble salt of an oxy-acid of sulfur having reducing properties or a water-soluble addition compound of one such salt with an aldehyde. Examples of suitable reducing agents are sodium bisulfite, potassium bisulfite, sodium sulfite, potassium sulfite, sodium hydrosulfite, potassium hydrosulfite, sodium formaldehyde sulfoxylate, potassium formaldehyde sulfoxylate, and zinc formaldehyde sulfoxylate. The catalyst activator can be a water-soluble iron salt, preferably chosen from the following group: ferrous sulfate, ferrous ammonium sulfate, ferrous chloride, and ferric chloride. The sequestering agent can be any compound effective to sequestrate polyvalent metallic iron cations in the solution by forming a complex with said cations. Suitable for use as sequestering agents, are, for example, sodium hexametaphosphate, sodium pyrophosphate, and sodium silicate. Amazingly enough, as will be seen later in the description of the preferred wetting agents, some non-ionic surface-active agents can be used to serve the dual function of wetting agent and sequestering agent.

Only catalytic amounts of oxidizing agent need be used in formulating the present latex paints. Thus, 0.1 to 4% by weight of the monomer to be polymerized is an adequate quantity. If quantities lower than 0.1% are used it is doubtful if the polymerization will be complete. The preferred range is between 0.1 and 1%. The relative molecular amounts of reducing agent to oxidizing agent to be used are from 2:3 to 1:1. Only a trace of activator is enough to initiate the polymerization. Thus, although up to 0.1% of ferrous sulfate by weight of the monomer or even more can be used, 0.0023% is a satisfactory quantity. An equimolar quantity of iron as other salts can be substituted. The amount of sequestering agent used in conjunction with the iron salt activator varies according to the amount of iron salt used and should be carefully controlled. The optimum molar ratio of sequestering agent to iron ion is 1:1, while molar ratios of from 2:1 to 1:2 are within a preferred operable range.

The aqueous pigment dispersion normally contains a prime pigment, an extender pigment, a dispersing aid, and the required amount of water. Most of the normally employed prime pigments can be safely incorporated into the pigment dispersion of the present invention. A highly recommended pigment is titanium dioxide, for example Titanox RA-50, but other pigments can be employed. Among such are iron oxides, lithopone, and zinc sulfides. Mixed pigments, like calcium extended titanium pigments (e.g. Titanox C-50) can also be used.

Zinc oxide, due to its chemical activity, is not recommended as a prime pigment for use in the compositions of the present invention, nor are any prime pigments that, like zinc oxide, are reactive to even weak acid concentrations. The amount of prime pigment to use depends upon the quality required from the finished paint, as is well known in the art.

Extender pigments are normally used in conjunction with prime pigments to improve flow and brushing characteristics of a paint and to reduce raw materials cost, the preferred proportion being dependent on the use to which the paint is to be applied. Among such extender pigments, mica, aluminum silicate known commercially as ASP-400, Lorite, a precipitated calcium carbonate with about 20% diatomaceous silica, and Celite, a diatomaceous earth, are recommended for use with compositions of the present invention.

The term "pigment volume concentration" or "P.V.C." is well known in the paint art to refer to the volume of the pigment solids in a paint composition expressed as a percentage of the total volume of all the solids (pigment plus binder) in the paint composition.

The pigment volume concentration (P.V.C.) may vary over wide ranges according to the application foreseen for the paint. Good quality paints usually have a 25 to 40% P.V.C. Excellent quality paints giving highly glossy finished surfaces may have a P.V.C. as low as 8%. Poorer quality paints, having less rub-off resistance but adequate binding power for applications such as coating acoustic tile, may have a P.V.C. as high as 80%. Any pigment volume concentration up to just below the amount which would destroy the physical properties and/or continuity of the resin film may be used. It may be remarked that the finer particle size emulsions of the present paints will permit a greater concentration of pigment to be stably incorporated than that tolerated by ordinary paints before film failure or weakening occurs. However the process of this invention is not to be restricted to these compositions and is successfully applied to paint formulations having a normal or low P.V.C.

The aqueous pigment dispersion is prepared by dry blending the pigments and colours, if any, incorporating water containing a dispersing aid, and mixing by any known procedure until a uniform dispersion is obtained. Various known dispersing aids or mixtures thereof can be employed, preferably in the range from 0.1 to 3% by weight of the dry pigments. Preferred dispersing aids are Tergitol NPX, an alkyl phenyl polyethylene glycol ether, and Tamol 731, a sodium salt of a condensed arylsulfonic acid.

Coloured paints can be made by the same technique used in making the white paints, using coloured pigments. The coloured pigments are evidently subject to the same restrictions as to suitability and compatibility as when used in ordinary polyvinyl acetate latex paints. Among the commercially available colour pigments, Ferrite Red Light is satisfactory although it shows some degree of polymerization inhibition. Chrome Oxide Green and Chrome Yellow Medium give good coloured paints. Tinting of white paints can also be done by mixing ready-made aqueous coloured pigment dispersions with previously prepared white paints.

A wetting agent is required to emulsify the monomer in preparing a paint and to lower surface tension of the finished paint, thus making the finished paint wet more readily the surface to which it is applied. Wetting agents are normally used in the proportion of 0.3-4% of the total paint weight. Anionic, non-ionic, or cationic wetting agents can be used in making the present paints. As mentioned before, some non-ionic surface active agents can be used to serve the dual function of wetting agents and sequestering agents. Thus, Span 20, i.e. sorbitan monolaurate, and Pluronics, a group of surface-active agents prepared by condensing ethylene oxide with the reaction product of propylene oxide and propylene glycol, can serve as both wetting agent and sequestering agent. Two of these, Pluronic F68 and Pluronic L62, having an approximate molecular weight of 8000 and 2000 respectively, give a finished paint having very good properties. The finished product is neither improved nor deteriorated by the use of a separate sequestering agent. Span 20, on the other hand, gives a rather grainy product which is somewhat improved when a separate sequestering agent is used. In contrast to the above compounds, Lubrol W, anhydrous condensation product of a long chain fatty alcohol and ethylene oxide, by itself an efficient wetting agent and sequestering agent for the purposes of this invention, cannot be used in presence of a separate sequestering agent. Sodium pyrophosphate, for example, has a coagulating effect on paints containing Lubrol W. On the other hand, Antarox A-400, nonyl phenoxy polyoxyethylene ethanol, has to be used in presence of a sequestering agent distinct from these wetting agents, otherwise no polymerization occurs. Both Lubrol W and Antarox A-400 give very good finished products when used under the correct conditions.

The group of anionic wetting agents that can be used for the purpose of this invention is exemplified by Santomerse D, decyl benzyl sodium sulfonate, which as a 30% aqueous solution is known as Santomerse S, and by Aerosol OT, dioctyl sodium sulfosuccinate. Anionic wetting agents must be used in presence of separate sequestering agents such as those described above.

Cationic wetting agents can also be used efficiently in preparing paints of the invention, as exemplified by stearamidopropyldimethyl-β-hydroxyethyl ammonium dihydrogen phosphate, a product sold commercially as "Cationic SP." Cationic wetting agents can be used in presence of a sequestering agent distinct from the wetting agent.

Latex paints need some protective colloid to achieve the optimum brushing and levelling characteristics. The amount used in ordinary latex paints is about 2–6% by weight of the solid content of the paint. In paints of the present invention, lesser amounts of protective colloid are necessary. Thus, the preferred range of protective colloid is 0.5–2% by weight of the solid content of the paint.

Hydroxyethyl cellulose is an excellent protective colloid for the purpose of this invention. Hydroxyethyl cellulose is sold commercially in different grades. Cellosize WP-09, hydroxyethyl cellulose having a viscosity of 70–110 cps. as a 5% aqueous solution at 20° C., Cellosize WP-300, hydroxyethyl cellulose having a viscosity of 225–275 cps. as a 2% aqueous solution at 20° C., and Cellosize WP-4400, hydroxyethyl cellulose having a viscosity of 3500–5000 cps. as a 2% aqueous solution, are the three grades shown in the examples. Methocel 4000, a methyl cellulose having a viscosity of 4000 centipoises as a 2% aqueous solution at 20° C., is less satisfactory as it gives lower viscosity paints. Jaguar 503A or any similar guar gum is recommended if it is desired to produce very high viscosity paints. Protective colloids are conveniently used as 2–5% aqueous solutions.

In preparing the paints of the present invention, the pigment dispersion is first prepared as described above. A uniform dispersion is obtained by passing the mixture of ingredients through a suitable pigment grinding apparatus, e.g. a ball mill or a colloid mill. The protective colloid is usually added to the pigment dispersion together with the monomer and all other ingredients. Optionally, it can be added together with the other components of the pigment dispersion before the mixing and grinding operations. All other ingredients including the monomer (addition of part of which may be delayed), are then added to the pigment dispersion while stirring. Good agitation is needed during the entire time of polymerization. Conventional type stirrers may be used. However, a stainless steel stirrer having a rotating shaft with a disc mounted on the lower end thereof in a plane perpendicular to the shaft and with the largest part of the disc divided radially into about twelve sections each twisted about 25°–30° from the plane of the disc for upward thrust, is especially suited for the present application. Preferably a scraping device is mounted at a suitable position on the shaft of the stirrer to prevent the formation of the crust which tends to form on the surface of the mixture during polymerization. Care should be taken to avoid the formation of a vortex which is caused by excessive speeds.

No heating facilities need be provided, although heating may cut down the inhibition period. The polymerization takes place at temperatures down to extremes like 5° C. with vinyl ester monomers. In this last case, an induction period up to ten minutes may occur before the reaction mixture starts to polymerize at a noticeable rate. Using vinyl acetate as the polymerizable constituent at temperatures around 25° C., this induction period is practically eliminated; initial temperatures up to about 30° C. to 40° C. are satisfactory.

It is to be noted that the temperature of the reaction must not, during the early stages of the polymerization, reach the distillation temperature of the azeotropic mixture formed from the monomeric liquid and water. For vinyl acetate, this temperature is 66–68° C., for vinyl propionate, 80–82° C., and for vinyl butyrate, 90–93° C. In polymerization kettles up to 5 gallons capacity, heat losses keep the temperature to a suitably low level. In polymerization kettles exceeding 5 gallons capacity, water cooling provisions may be necessary. If the temperature rises until the azeotrope refluxes, there will be some clogging and foaming. Even if the polymerization can be completed, the finished paint will be grainy and inferior. On the other hand, as the polymerization proceeds, the reaction mixture becomes more stable to heat and can withstand temperatures even higher than 70° C. in the case of vinyl acetate, without refluxing and coagulating. Increasing the amount of protective colloid used also renders the mixture more stable to high temperatures, once the polymerization has started.

Complete polymerization takes from 75 minutes to about six hours. For some of the monomers, e.g. vinyl esters, completion is easily characterized by the disappearance of the ester odor of the monomeric liquid. Another way of testing the completeness of polymerization is to heat the reaction product to the boiling temperature of the monomer. There will be no refluxing if the polymerization is complete.

It is also possible to measure quantitatively the completeness of the polymerization by ash content analysis of the finished product. About 20 g. of paint is placed in an aluminum dish and dried to constant weight in a recirculating air oven maintained at 130° C. to obtain a solid residue. About 7–8 g. of the solid residue is weighed accurately into a crucible and heated with a Bunsen burner until constant weight of the resulting ash has been attained. The ash content of the solid residue is calculated. From the initial paint formulation, the theoretical percentage of ash in the residue, if all monomer had polymerized, can be calculated and the percent conversion of monomer to polymer obtained by comparison of the theoretical and actual ash contents.

It is preferable that the residue constituent of the paint be plasticized, either internally or externally, to aid in initial film formation during paint drying. The use of some combinations of copolymerizable monomers, as above described, provides internal plasticization. Two to 30% by weight based on the total resin is a suitable proportion of monomer used for internal plasticizing, but this is not critical. External plasticizers may be any of the liquids well known in the art, for example, dibutyl phthalate in the case of vinyl esters. They may be incorporated in the paint after the completion of the polymerization, by stirring. Ten to 15% of the paint binder, on a volume basis, is a suitable proportion of external plasticizer.

For purposes of assessing or comparing the pigment binding power of paints, a dry rub test and a wet rub test are used. They are designed to test the ability of a paint film to retain its pigment when being rubbed with a dry or wet cloth, respectively. The wet rub test is also an indication of the amount of pigment rub-off which will occur when painted surfaces are washed as in ordinary household cleaning.

The dry and wet rub tests are performed in the following manner: a paint film is laid down on a smooth suface such as metal, glass, plastic, etc. and allowed to dry and age at room temperature and humidity for at lease 16 hours. The dry rub test is performed by rubbing a piece of dry unsized cotton cloth on the paint film and noting the amount of paint imparted to the cloth. The wet rub test is performed in the same manner except that a wet cotton cloth is used. A paint is satisfactory in regard to these tests when no visible amount of paint is imparted to the cloth after 10 strokes.

A scrub resistance test is used to measure the resistance to wear or the mechanical strentgh of the paint film. One coat of the paint is applied to a smooth surface such as a glass or a plastic panel and allowed to dry overnight. The panel is then placed in a Gardner Model 105 Straight Line Washability Machine, immersed in water and scrubbed with a hog-bristle brush supplied with the instrument. The scrub resistance test consists of the number of cycles necessary to scrub the paint film to destruction. Each cycle consists of a complete forward and reverse movement. A paint is said to pass this test if the paint film can withstand 1500 cycles without showing any sign of destruction.

Other qualities of a paint that can be assessed qualitatively are its film forming, film leveling, and film flexibility. To form a film, a layer of paint 3½ mils thick and 5 inches wide is deposited on a flexible polyvinyl chloride sheet and left to dry for two days. A paint is said to form a good film when, under visual examination, the dry film shows no grits or coagulation. Good film levelling is described as the property of a paint to give a smooth film when applied by a brush. Film flexibility is assessed by bending a paint film, formed as described above, over a ½ inch diameter mandrel. It is rated as good when the film, after being subjected to said treatment, shows no cracking or peeling when viewed under 10-power magnification.

EXAMPLES

The following examples are typical of aqueous emulsion paints prepared according to the process of the present invention. They are intended to illustrate but not to limit the scope of the invention. Parts are by weight unless otherwise indicated. Where indicated, the monomer was washed with a 5% NaOH–20% NaCl aqueous mixture to remove any trace of inhibitor. Pigment dispersions A to F were prepared by mixing their various components which are shown in Table I. Numerals refer to parts by weight.

*Table I*

| Components | Pigment Dispersion | | | | | |
|---|---|---|---|---|---|---|
| | A | B | C | D | E | F |
| Titanox RA-50 | 61.0 | 520 | 427.6 | 427.6 | 427.6 | 520 |
| Lithopone | 13.06 | | | | 67.2 | |
| Celite | | | | 134.4 | | |
| ASP-400 | | | 134.4 | | 67.2 | |
| Mica | 6.10 | | | | | |
| Tergitol NPX | 0.43 | 3.5 | 3.0 | 3.0 | 3.0 | 15.0 |
| Water | 54.42 | 381.6 | 381.6 | 381.6 | 381.6 | 381.6 |

After a smooth mix was obtained by stirring, each dispersion was ground by passage through an Eppenbach Homo-Mixer.

EXAMPLE 1

Example 1 was carried out according to the general method described above, in a 400 cc. open beaker. The initial ingredients used were:

| | Parts by weight |
|---|---|
| Pigment dispersion A | 135 |
| Water | 45 |
| Vinyl acetate | 100 |
| Cellosize WP-4400 (3% aqueous solution) | 50 |
| Santomerse S | 0.9 |

100 parts of vinyl acetate monomer were used, of which 56 parts were considered effective and 44 lost by evaporation. Calculations for paint compounding were therefore based on the effective amount of monomer. The foregoing ingredients were stirred in the beaker. The following reduction activated catalyst system was then added:

| | Parts by weight |
|---|---|
| $K_2S_2O_8$ | 0.15 |
| Sodium formaldehyde sulfoxylate | 0.10 |
| $FeSO_4$ | 0.03 |
| $Na_4P_2O_7$ | 0.10 |

A smooth polymerization took place with no induction period. No cooling or heating was necessary. After three hours of stirring, the polymerization was complete and dibutyl phthalate (DBP) plasticizer was added. A white paint of medium viscosity was obtained. It gave a smooth film, having good gloss, excellent dry and wet rub-off properties, and good scrub resistance.

EXAMPLE 2

Example 2 was carried out in a 400 cc. open beaker according to the general method described above. The initial ingredients employed were:

| | Parts by weight |
|---|---|
| Pigment dispersion A | 135 |
| Water | 45 |
| Vinyl acetate | 100 |
| Methocel 4000 (3% aqueous solution) | 50 |
| Santomerse S | 0.6 |

Calculations were based on the effective amount of monomer used (56 parts). The difference was lost by evaporation. To a mixture of these ingredients, were added:

| | Parts by weight |
|---|---|
| $K_2S_2O_8$ | 0.15 |
| Sodium formaldehyde sulfoxylate | 0.10 |
| $FeSO_4$ | 0.03 |
| $Na_4P_2O_7$ | 0.10 |

After 45 minutes of smooth polymerization, 0.05 part of sodium formaldehyde sulfoxylate and 0.1 part of $K_2S_2O_8$ were added. After 30 additional minutes, the polymerization was considered complete and DBP plasticizer was added. A low viscosity paint was obtained that gave a good wet rub-off test. The scrub resistance was at least 1900 cycles.

EXAMPLE 3

Example 3 was carried out in a closed 1 litre emulsion kettle. No provisions were made for heating or cooling the kettle. The temperature of the reaction mixture was given by a thermometer placed in close parallel relationship with the stirrer's shaft and supported from the top of the kettle. The maximum temperature associated with a catalyst addition was noted. The starting temperature was 25° C. The kettle was equipped with an efficient stirrer electrically driven at 120 revolutions per minute. The stirrer and associated scraping device were the same as described above under the general method. The following ingredients were introduced into the kettle:

| | Parts by weight |
|---|---|
| Pigment dispersion A | 405 |
| Water | 135 |
| Vinyl acetate | 168 |
| Cellosize WP-4400 (3% aqueous solution) | 150 |
| Santomerse S | 1.8 |

This was followed by addition of:

| | Parts by weight |
|---|---|
| $K_2S_2O_8$ | 0.45 |
| Sodium formaldehyde sulfoxylate | 0.30 |
| $FeSO_4$ | 0.09 |
| $Na_4P_2O_7$ | 0.30 |

The reaction mixture was stirred for 1½ hours. The maximum temperature noted was 69° C. After addition of 17 parts of DBP plasticizer to the mixture, the composition was a white paint that had a fair gloss, good wet and dry rub-off properties, and scrub resistance. The product of Example 3 was considered incompletely polymerized and the temperature rise at the start of the polymerization was considered unsafe. Therefore, a delayed monomer addition technique was adopted in all subsequent examples.

The delayed monomer addition technique consists in adding the monomer and the catalytic ingredients in two portions. The reaction kettle is charged, while stirred efficiently, with 30–70% of the total amount of monomer, 50–80% of the total amount of oxidizing agent, 50–100% of the total amount of reducing agent, and all the remaining paint components including dispersed pigment composition, activator, wetting agent, protective colloid, and, where necessary, separate sequestering agent. The order in which these ingredients are added is immaterial. The reaction mixture starts to polymerize and the temperature reaches a maximum, then the mixture starts to cool.

The delayed monomer is then added to the reaction kettle over a suitable period, for example one to four hours, at a rate which precludes the temperature rising to the refluxing temperature. The second catalyst addition follows this delayed monomer addition period. The oxidizing agent for this second catalyst addition need not be the same as for the first one, although it is preferred and more convenient to use the same compound in both additions. The choice of oxidizing agent for this second catalyst addition is not as important as in the first case, because, by the time this relayed addition is made, the emulsion has attained a certain degree of stability while polymerizing. Thus, hydroperoxides, e.g. cumene hydroperoxide, are satisfactory for this purpose. The temperature reaches a maximum again, following this delayed catalyst addition. Stirring is continued for an additional one to four hour period at the end of which polymerization is complete.

EXAMPLE 4

Example 4 was carried out in a closed 1 litre emulsion kettle using the delayed monomer addition technique described above. No provisions were made for heating or cooling the kettle. The stirrer and associated scraping device were the same as described above under the general method. A vigorous agitation was provided. The initial proportions of ingredients were:

| | Parts by weight |
|---|---|
| Pigment dispersion A | 405 |
| Water | 135 |
| Vinyl acetate | 56 |
| Cellosize WP-4400 (3% aqueous solution) | 150 |
| Santomerse S | 1.8 |
| $K_2S_2O_8$ | 0.45 |
| Sodium formaldehyde sulfoxylate | 0.30 |
| $FeSO_4$ | 0.09 |
| $Na_4P_2O_7$ | 0.30 |

The maximum temperature that followed the catalyst addition was 47° C. 112 parts of vinyl acetate were then added over a period of 1½ hours. After the delayed addition of monomer was completed, a second catalyst addition was made, consisting of 0.1 part of cumene hydroperoxide and 0.1 part of sodium formaldehyde sulfoxylate. The maximum temperature following this second catalyst addition was 53° C. Stirring was continued for 20 minutes after this second catalyst addition. Finally 17 parts of DBP plasticizer were added. A white paint was thus obtained that gave a good gloss and had very good dry and wet rub-off and scrub resistance properties.

EXAMPLE 5

Example 5 was carried out in a closed 1 litre emulsion kettle using the delayed monomer addition technique described above. No provisions were made for heating or cooling the kettle. The stirrer and associated scraping device were the same as described above in connection with the general method. The initial proportions of ingredients were:

| | Parts by weight |
|---|---|
| Pigment dispersion A | 405 |
| Water | 135 |
| Vinyl acetate | 56 |
| Cellosize WP-4400 (3% aqueous solution) | 150 |
| Pluronic F68 | 12 |
| $K_2S_2O_8$ | 0.45 |
| Sodium formaldehyde sulfoxylate | 0.30 |
| $FeSO_4$ | 0.09 |
| $Na_4P_2O_7$ | 0.30 |

The reaction mixture was stirred efficiently. The mixture attained a maximum temperature of 53° C. 112 parts of vinyl acetate were then added over a period of 1¼ hours. At the end of this period, 0.1 part of $K_2S_2O_8$ was added. The temperature rose to a maximum of 71° C. Stirring was continued for 1½ hours, then 17 parts of DBP plasticizer were added. A smooth, glossy paint was obtained which had excellent resistance to dry and wet rub-off and to scrub tests.

In Table II are set forth the initial proportions of reactants used in Examples 6–14 and 18–20.

Table II

| | Parts by weight |
|---|---|
| Pigment dispersion | 405 |
| Water | 135 |
| Vinyl acetate | 56 |
| Cellosize WP-4400 (3% aqueous solution) | 150 |
| Pluronic F68 | 6 |
| $K_2S_2O_8$ | 0.45 |
| Sodium formaldehyde sulfoxylate | 0.30 |
| $FeSO_4$ | 0.09 |
| $Na_4P_2O_7$ | 0.30 |

EXAMPLE 6

Example 6 was carried out in a closed 1 litre emulsion kettle using a delayed monomer addition technique. No heating or cooling of the kettle was necessary. The initial proportions of ingredients are shown in Table II, The pigment dispersion used was pigment dispersion A, the composition of which is shown in Table I. This charge was stirred efficiently, using a stirrer and associated scraping device as described above in connection with the general method.

The temperature rose to a maximum of 55° C. 112 parts of vinyl acetate were added over a period of 1¼ hours. This was followed by addition of 0.1 part of $K_2S_2O_8$. The maximum temperature following this second catalyst addition was 70° C. Stirring was continued for 2 hours, then 17 parts of DBP were added. A white paint was then obtained very similar to the one given by Example 5 in appearance and properties.

Small amounts of different coloured paints were prepared from this white paint by mixing in Kentucky colour dispersions.

EXAMPLE 7

Example 7 was carried out in a closed 1 litre emulsion kettle using a delayed monomer addition technique. No heating or cooling of the kettle was necessary. The initial proportions of ingredients are shown in Table II. The pigment dispersion used was pigment dispersion A, the composition of which is shown in Table I. This charge was stirred efficiently, using a stirrer and associated scraping device identical with those described above in connection with the general method.

The maximum temperature was noted as 52° C. 84 parts of delayed vinyl acetate were added to the kettle over a period of 2 hours. 0.1 part of $K_2S_2O_8$ was then added. The temperature, which had gradually decreased, rose to 42° C. After stirring for an additional 2 hour period and then adding 17 parts of DBP, a finished composition was obtained. It was a white glossy paint that satisfactorily passed tests of wet and dry rub-off.

EXAMPLE 8

Example 8 was carried out in a closed 1 litre emulsion kettle using a delayed monomer addition technique. No heating or cooling of the kettle was necessary. The initial proportions of ingredients are shown in Table II. The pigment dispersion used was pigment dispersion A, the composition of which is shown in Table I. This charge was stirred efficiently, using a stirrer and associated scraping device identical with the ones described above in connection with the general method.

The temperature rose to a maximum of 47° C. 56 parts of delayed vinyl acetate were run in the kettle over a period of 3 hours. 0.1 part of $K_2S_2O_8$ was further added and stirring was continued for another 3 hour period. The maximum temperature following the second catalyst addition was 38° C. 17 parts of DBP were added at the end of this stirring period. A white semi-glossy paint was thus obtained which had good binding properties.

EXAMPLE 9

Example 9 was carried out in a closed 1 litre emulsion kettle using a delayed monomer addition technique. No heating or cooling of the kettle was necessary. The initial proportions of ingredients are shown in Table II. The pigment dispersion used was pigment dispersion A, the composition of which is shown in Table I. This charge was stirred efficiently, using a stirrer and associated scraping device identical with those described above in connection with the general method.

The temperature rose to a maximum of 45° C. 37⅓ parts of delayed vinyl acetate were added to the initial reaction mixture over a period of 1½ hours. 0.1 part of $K_2S_2O_8$ was further added at the end of this period and stirring was continued for a period of 2½ hours. The maximum temperature following the second catalyst addition was 40° C. 17 parts of DBP were then added. The white paint thus obtained had a dull finish and good dry and wet rub-off properties.

EXAMPLE 10

Example 10 was carried out in a closed 1 litre emulsion kettle using a delayed monomer addition technique. No heating or cooling of the kettle was necessary. The initial proportions of ingredients are shown in Table II. The pigment dispersion used was pigment dispersion A, the composition of which is shown in Table I. This charge was stirred efficiently, using a stirrer and associated scraping device identical with those described above in connection with the general method.

The maximum temperature that followed was 44° C. 18⅔ parts of delayed vinyl acetate were added to the reaction kettle over a period of 1½ hours, then 0.1 part of $K_2S_2O_8$ was added and the mixture was stirred for 1 hour within which the maximum temperature attained was 40° C.; 17 parts of DBP were then added. A dull finish paint was obtained which when rubbed with a dry cotton cloth, left an appreciable amount of paint on said cloth.

EXAMPLES 11-14

Examples 11-14 were carried out in a closed 1 litre emulsion kettle using a delayed monomer addition technique. No heating or cooling of the kettle was necessary. The pigment dispersions (B-E) used in these examples respectively were as shown in Table III. The composition of each of the pigment dispersions is shown in Table I. The proportions of initial ingredients were as shown in Table II. The charge was stirred efficiently. The stirrer and associated scraping device were as described in connection with the general method. In each of these Examples 11-14, 112 parts of delayed vinyl acetate were added over a period of time shown in Table III. The delayed vinyl acetate addition was followed by addition of 0.1 part of $K_2S_2O_8$. The maximum temperatures noted at the start of the polymerization and after the second addition of oxidizing agent are shown in Table III. The stirring period following this second addition is also shown in Table III. 17 parts of DBP were added in each of these Example 11-14 at the end of the stirring period. Finally, Table III shows the finished paint characteristics.

*Table III*

| Example No. | 11 | 12 | 13 | 14 |
|---|---|---|---|---|
| Pigment Dispersion | C | D | E | B |
| Time taken to add delayed monomer (hrs.) | 4 | 2½ | 4 | 4 |
| Maximum temperature at start of polymerization (° C.) | 50 | 50 | 50 | 52 |
| Maximum temperature after second catalyst addition (° C.) | 42 | 60 | 48 | 47 |
| Stirring period following 2nd catalyst addition (hrs.) | 1 | 3 | 2 | 1 |
| Paint characteristics: | | | | |
| (1) Gloss | (1) | (2) | (3) | (4) |
| (2) Binding | (5) | (5) | (5) | (5) |

¹ Slight.  ² Flat.  ³ Medium.  ⁴ Very high.  ⁵ Good.

EXAMPLE 14A

Example 14A was carried out in the same manner as Example 14 except that zinc formaldehyde sulfoxylate was substituted for sodium formaldehyde sulfoxylate in the same amount and that 56 parts of delayed vinyl acetate were added instead of 112 parts. The reaction went faster than usual. A very good paint was obtained which had the same properties as the one given by Example 14.

EXAMPLE 14B

Example 14B was carried out in the same manner as Example 14A except that sodium bisulfite was substituted for sodium formaldehyde sulfoxylate in the same amount. The polymerization was slower than usual. The finished product satisfactorily passed the tests for rub-off and scrub resistance.

EXAMPLE 15

Example 15 was carried out in a closed 1 litre emulsion kettle using a delayed monomer addition technique. The dispersed pigment composition was as follows:

| | Parts by weight |
|---|---|
| Ferrite Red Light | 620 |
| Methocel 100 (3% solution in water) | 175 |
| Tamol 731 (10% solution in water) | 7 |
| Water | 400 |

This composition, in the proportions indicated below, was run in the emulsion kettle together with other starting ingredients. Initial proportions were as follows:

| | Parts by weight |
|---|---|
| Pigment dispersion | 405 |
| Water | 135 |
| Vinyl acetate | 56 |
| Cellosize WP-4400 (3% aqueous solution) | 150 |
| Pluronic F68 | 6 |
| $K_2S_2O_8$ | 0.75 |
| Sodium formaldehyde sulfoxylate | 0.50 |
| $FeSO_4$ | 0.09 |
| $Na_4P_2O_7$ | 0.30 |

The charge was stirred efficiently. A scraping device was used to prevent crust formation on top of the liquid during polymerization. Both stirrer and associated scraping device were as described in connection with the general method.

After an induction period of 5-10 minutes, the mixture started to polymerize and reached a maximum temperature of 50° C. 112 parts of vinyl acetate were then added over a period of 2 hours. The delayed monomer addition was followed by addition of 0.1 part of $K_2S_2O_8$ and 0.1 part of sodium formaldehyde sulfoxylate. The temperature rose to a maximum of 70° C. upon addition of this second quantity of catalytic agents. The mixture was stirred for an addition 1 hour. 17 parts of DBP were then added. A fairly dull, well dispersed deep red paint was thus obtained. Tests showed that it had good wet and dry rub-off properties.

EXAMPLE 16

Example 16 was carried out in a closed 1 litre emulsion kettle using a delayed monomer addition technique. The dispersed pigment composition was as follows:

| | Parts by weight |
|---|---|
| Chrome Oxide Green | 310 |
| Lorite | 180 |
| ASP-400 | 220 |
| Tamol 731 (10% aqueous solution) | 7 |
| Water | 490 |

The composition was run in the emulsion kettle together with the other starting ingredients. Initial proportions were as follows:

| | Parts by weight |
|---|---|
| Pigment dispersion | 405 |
| Water | 135 |
| Vinyl acetate | 56 |
| Cellosize WP–4400 (3% aqueous solution) | 150 |
| Pluronic F68 | 6 |
| $K_2S_2O_8$ | 0.45 |
| Sodium formaldehyde sulfoxylate | 0.30 |
| $FeSO_4$ | 0.09 |
| $Na_4P_2O_7$ | 0.30 |

The charge was stirred efficiently. A scraping device was used to prevent crust formation on top of the liquid during polymerization. Both stirrer and associated scraping device were as described in connection with the general method of carrying out the process. The mixture started to polymerize and reached a maximum temperature of 56° C. 112 parts of vinyl acetate monomer were then added over a period of 2 hours. The delayed monomer addition was followed by addition of 0.1 part of $K_2S_2O_8$. The temperature rose to a maximum of 48° C. The mixture was stirred for an additional hour. 17 parts of DBP were then added. A deep green dull paint was thus obtained. It had good binding properties.

EXAMPLE 17

Example 17 was carried out in a closed 1 litre emulsion kettle using a delayed monomer addition technique. The dispersed pigment composition was as follows:

| | Parts by weight |
|---|---|
| Chrome Yellow Medium | 180 |
| Titanox RA–50 | 135 |
| ASP–400 | 225 |
| Lorite | 180 |
| Tamol 731 (10% aqueous solution) | 7 |
| Water | 490 |

This composition was run in the emulsion kettle together with the other starting ingredients. Initial proportions were as follows:

| | Parts by weight |
|---|---|
| Pigment dispersion | 405 |
| Water | 135 |
| Vinyl acetate | 56 |
| Cellosize WP–4400 (3% aqueous solution) | 150 |
| Pluronic F68 | 6 |
| $K_2S_2O_8$ | 0.45 |
| Sodium formaldehyde sulfoxylate | 0.30 |
| $FeSO_4$ | 0.09 |
| $Na_4P_2O_7$ | 0.30 |

The charge was stirred efficiently. A scraping device mounted on the shaft of the stirrer was used to prevent crust formation on top of the liquid during polymerization. Both stirrer and associated scraping device were as described in connection with the general method. The mixture started to polymerize and reached a maximum temperature of 40° C. 112 parts of vinyl acetate monomer were then run in the emulsion kettle over a period of 2 hours. This was followed by addition of 0.1 part of $K_2S_2O_8$. The temperature rose to 68° C. upon this last addition. Stirring was continued for 2 more hours, then 17 parts of DBP were added. A deep yellow dull paint was thus obtained which had good binding properties.

EXAMPLE 18

Example 18 was carried out in a closed 1 litre emulsion kettle using a delayed monomer addition technique. The initial proportions of ingredients were as shown in Table II. The pigment dispersion used was pigment dispersion B, the composition of which is shown in Table I. The reaction mixture was stirred efficiently. A scraping device was also used to prevent crust formation on top of the liquid during polymerization. Both stirrer and associated scraping device were as described under the general method. The mixture started to polymerize and reached a maximum of 47° C. 78.4 parts of vinyl acetate and 32.2 parts of butyl acrylate were then mixed together and added over a period of 3½ hours. This was followed by addition of 0.1 part of $K_2S_2O_8$. The maximum temperature following addition of $K_2S_2O_8$ was 50° C. Stirring was continued for 2 hours. No plasticizer was added. A glossy paint having a very high viscosity was thus obtained. This paint had good binding properties and gave a flexible film upon application on a plastic surface.

EXAMPLE 18A

Example 18A was carried out in the same manner as Example 18 except that decyl acrylate was substituted for butyl acrylate in the same amount. The paint obtained did not need addition of plasticizer and was identical in properties with the paint given by Example 18.

EXAMPLE 19

Example 19 was carried out in a closed 1 litre emulsion kettle using a delayed monomer addition technique. The initial proportions of ingredients were as shown in Table II. The pigment dispersion used was pigment dispersion B, the composition of which is shown in Table I. The reaction mixture was stirred efficiently. A scraping device was also used to prevent crust formation on top of the liquid during polymerization. Both stirrer and associated scraping device were as described above under the general method.

The mixture started to polymerize and reached a maximum of 46° C. 74.6 parts of vinyl acetate and 41.5 parts of dibutyl fumarate previously mixed together were then added over a period of 1½ hours. This was followed by addition of 0.1 part of $K_2S_2O_8$ and 0.1 part of sodium formaldehyde sulfoxylate. The temperature rose to 39° C. Stirring was continued for 3 hours. 0.1 part of $K_2S_2O_8$ was then added and the mixture was stirred for 2 more hours. No plasticizer was added. The glossy paint thus obtained had good binding properties.

EXAMPLE 20

Example 20 was carried out in a closed 1 litre emulsion kettle using a delayed monomer addition technique. The initial proportions of ingredients were as shown in Table II. The pigment dispersion used was pigment dispersion B, the composition of which is shown in Table I. The reaction mixture was stirred efficiently. A scraping device was also used to prevent crust formation on top of the liquid during polymerization. Both stirrer and associated scraping device were as described above under the general method. The initial charge started to polymerize readily. The temperature rose to a maximum of 48° C. 74.6 parts of vinyl acetate and 36.7 parts of vinyl propionate were then added over a period of 2 hours, followed by addition of 0.1 part of $K_2S_2O_8$. Upon this last addition, the temperature rose to 50° C. After stirring for 2 more hours, 0.1 part of $K_2S_2O_8$ was added again and the mixture was again stirred for another 2 hour period. No plasticizer was added to the finished product which gave a glossy paint film having good binding properties.

EXAMPLE 20A

Example 20A was carried out in the same manner as Example 20 except that vinyl 2-ethyl hexoate was substituted for vinyl propionate in the same amount. The polymerization was slower than when using vinyl propionate as copolymerizable monomer but the paint had the same qualities as the product given by Example 20. No plasticizer was added to the finished product.

EXAMPLE 21

Example 21 was carried out in a closed 1 litre emulsion kettle using a delayed monomer addition technique. The pigment dispersion used was pigment dispersion B, the composition of which is shown in Table I. The initial charge proportions were as follows:

| | Parts by weight |
|---|---|
| Pigment dispersion B | 405 |
| Water | 135 |
| Vinyl propionate | 55 |
| Cellosize WP-4400 (3% aqueous solution) | 150 |
| Pluronic F68 | 6 |
| $K_2S_2O_8$ | 0.45 |
| Sodium formaldehyde sulfoxylate | 0.30 |
| $FeSO_4$ | 0.09 |
| $Na_4P_2O_7$ | 0.30 |

The reaction mixture was stirred efficiently. A scraping device was also used to prevent crust formation on top of the liquid during polymerization. Both stirrer and associated scraping device were as described under the general method. The polymerization proceeded smoothly. 55 parts of delayed vinyl propionate were added over a period of 4 hours. Then 0.1 part of $K_2S_2O_8$ was added and stirred in for 1 hour. No plasticizer was added. A smooth, glossy and flexible film was obtained from the finished paint.

EXAMPLES 22–32

In these examples, the initial charge, mixed in a 1 litre emulsion kettle equipped with a stirrer and an associated scraping device, was as follows:

| | Parts by weight |
|---|---|
| Pigment dispersion B | 405 |
| Water | 135 |
| Vinyl acetate | 56 |
| Cellosize WP-4400 (3% aqueous solution) | 150 |
| Wetting agent | 6 |
| $K_2S_2O_8$ | 0.45 |
| Sodium formaldehyde sulfoxylate | 0.30 |
| Catalyst activator | 0.09 |
| Sequestering agent (when used in addition to the wetting agent) | 0.30 |

In Examples 22 and 23, 56 parts of delayed vinyl acetate were added. In Examples 24-32, 112 parts of delayed vinyl acetate were added. The period of addition of delayed monomer for these Examples 22-32 ran from 1-2¼ hours and was followed in each case by addition of 0.1 part of $K_2S_2O_8$. In Examples 22 and 23, 12 parts of dibutyl phthalate were added to the polymerized reaction product. In Examples 24-32, 17 parts of dibutyl phthalate were added. The results are summarized in Table IV. Table IV also specifies the catalyst activator used, the wetting agent, and the separate sequestering agent, if any.

*Table IV*

| Ex. No. | Wetting Agent | Separate Sequestering Agent | Catalyst Activator | Paint Characteristics |
|---|---|---|---|---|
| 22 | Pluronic F68 | $Na_4P_2O_7$ | $FeCl_3 \cdot H_2O$ | Good. |
| 23 | do | $Na_3SiO_3$ | $FeSO_4$ | Do. |
| 24 | do | None | $FeSO_4$ | Do. |
| 25 | Lubrol W | do | $FeSO_4$ | Do. |
| 26 | do | $Na_4P_2O_7$ | $FeSO_4$ | Coagulated. |
| 27 | Antarox A-400 | None | $FeSO_4$ | No polymerization. |
| 28 | do | $Na_4P_2O_7$ | $FeSO_4$ | Good. |
| 29 | Span 20 | $Na_4P_2O_7$ | $FeSO_4$ | Rather grainy slight gloss. |
| 30 | do | None | $FeSO_4$ | Very grainy, dull. |
| 31 | Aerosol OT | $Na_4P_2O_7$ | $FeSO_4$ | Good. |
| 32 | do | None | $FeSO_4$ | Coagulated. |

Examples 22 and 23 demonstrate that the catalyst activator can be an iron salt containing either ferrous or ferric ions. These two examples also show that the sequestering agent can be a typical compound capable of forming a complex with polyvalent iron ions. Examples 24 and 25 show that no sequestering agent separate from the wetting agent employed is needed in the case where Pluronic F68 or Lubrol W is the wetting agent. In the case where Lubrol W is the wetting agent, a separate sequestering agent has a coagulating effect on the system as shown by Example 26, although no such effect occurs when using Pluronic F68 and $Na_4P_2O_7$ as shown by Example 22. The wetting agents Antarox A-400 and Aerosol OT, as shown by Examples 27-28 and 31-32, must be used in conjunction with a sequestering agent separate from the wetting agents themselves. Finally, Span 20, as shown by Examples 29 and 30, can be used with or without a separate sequestering agent, although it gives a product at least slightly grainy in either case.

EXAMPLE 33

Example 33 was carried out in a closed 5 gallon stainless steel jacketed cylindrical kettle. The kettle was equipped with a stainless steel stirrer. The revolving shaft of the stirrer, located at the center of the kettle in a position axially therewith, was equipped at its lower end with 6 twisted radiating blades having their bases set in a plane perpendicular to the shaft of the stirrer, and adjacent blades being twisted so as to form an angle of about 30° C. with said plane. The stirrer was driven by an electric motor at 107 r.p.m. A scraping device was mounted at a suitable position on the shaft of the stirrer so as to scrape the surface of the reaction mixture and prevent any formation of crust at said surface during polymerization. The temperature of the mixture was given by a copper-constantan thermocouple placed in a small tube running vertically on the inner wall of the kettle. The pigment dispersion was made of:

| | Gm. |
|---|---|
| Titanox RA-50 | 7951.5 |
| Water | 5835.0 |
| Tergitol NPX | 53.5 |

These ingredients were mixed to form a slurry and then passed through a Premier Mill at a clearance of 2 mils. The dispersion was then charged to the kettle. Temperature at this point was 25° C. Stirring was started and the following ingredients were added in the following order:

| | |
|---|---|
| Cellosize WP-4400 (3% aqueous solution) | 5130 gm. |
| Water | 3820 gm. |
| Pluronic F68 | 205 gm. |
| Vinyl acetate | 2050 cc. |
| $Na_4P_2O_7$ | 10 gm. in 100 cc. $H_2O$. |
| Sodium formaldehyde sulfoxylate | 10 gm. in 100 cc. $H_2O$. |
| $K_2S_2O_8$ | 15 gm. in 400 cc. $H_2O$. |
| $FeSO_4$ | 3 gm. in 100 cc. $H_2O$. |

Polymerization started immediately upon addition of the last ingredient. Temperature reached a maximum of 45° C. after 5 minutes. 4100 cc. of relayed vinyl acetate were then run in the kettle over a period of 1¼ hours at the rates of 2100 cc. per hour for the first 15 minutes and 3600 cc. per hour for 1 hour. Stirring was continued for 2 hours during which the temperature decreased from 45° C. to 40° C. At this point, 3.5 gm. of $K_2S_2O_8$ in 100 cc. of water were added and the kettle stirred for 2½ hours. The temperature went from 40° C. to 55° C. then started to decrease to reach 45° C. at the end of the 2½ hour period. 575 gm. of dibutyl phthalate were then added over a period of 20 minutes and cooling water was run through the vessel jacket for 40 minutes. At this point, the thermocouple indicated an inside temperature of 25° C. The product was removed from the kettle. The properties of the product were as follows:

| | |
|---|---|
| Vinyl acetate odor | None. |
| Viscosity (at 20° C., with a Brookfield viscometer, No. 3 spindle at 20 r.p.m.) | 33 poises. |
| Ash content analysis | 53.9%. |
| Vinyl acetate conversion | 99.4%. |
| Paint film appearance | Glossy, smooth. |
| Rub-off tests | Good. |

EXAMPLE 34

Example 34 was carried out in the apparatus of Example 4. A vigorous agitation was provided. The initial proportions of reactants were:

| | Parts |
|---|---|
| Pigment dispersion F | 405 |
| Water | 100 |
| Cellosize WP-09 (3.3% aqueous solution) | 150 |
| Pluronic F68 | 18 |
| Pluronic L62 | 18 |
| Methyl acrylate (washed) | 29.2 |
| Ethyl acrylate (washed) | 27.75 |
| $Na_4P_2O_7$ | 0.3 |

These ingredients were mixed. The following catalytic components were then added:

| | Parts |
|---|---|
| $K_2S_2O_8$ (1.5% aqueous solution) | 10 |
| Sodium formaldehyde sulfoxylate | 0.2 |
| Sodium hydrosulfite | 0.4 |
| $FeSO_4$ | 0.1 |

A mixture of 58.4 parts of methyl acrylate and 55.5 parts of ethyl acrylate, previously washed, was then added slowly to the reaction kettle together with 0.3 part of sodium hydrosulfite, 0.1 part of $FeSO_4$, and 20 parts of a 1.5% aqueous solution of $K_2S_2O_8$. The temperature attained a maximum of 52° C. After the delayed monomer addition was completed, further amounts of $K_2S_2O_8$, $FeSO_4$, and sodium hydrosulfite were added, 0.1 part of each. The polymerization was completed in 1½ hours. The paint obtained had a good viscosity with filming, leveling, and flexibility rated good.

EXAMPLE 35

Example 35 was carried out in the apparatus of Example 4. A vigorous agitation was provided. The following initial ingredients were charged into the reaction kettle and mixed:

| | Parts |
|---|---|
| Pigment dispersion F | 405 |
| Water | 100 |
| Cellosize WP-300 (3% aqueous solution) | 150 |
| Pluronic F68 | 18 |
| Pluronic L62 | 18 |
| Butyl acrylate (washed) | 53.6 |
| $Na_4P_2O_7$ | 0.3 |

To the mixture was added:

| | Parts |
|---|---|
| $K_2S_2O_8$ (1.5% aqueous solution) | 10 |
| Sodium formaldehyde sulfoxylate | 0.2 |
| Sodium hydrosulfite | 0.2 |
| $FeSO_4$ | 0.1 |

59 parts of delayed butyl acrylate and 43.6 parts of acrylonitrile were then added together with 0.2 part of sodium hydrosulfite, 0.1 part of $FeSO_4$, and 20 parts of $K_2S_2O_8$ 1.5% aqueous solution. The addition of these compounds was made at a rate fast enough to keep the polymerization going. The maximum temperature was noted as 55° C. After this addition was completed and the temperature had dropped to 40° C., 0.1 part each of $K_2S_2O_8$ and $FeSO_4$ were further added. The resultant paint was thixotropic. Filming and leveling properties were good. Flexibility of the film was also rated good.

EXAMPLE 36

Example 36 was carried out in the apparatus of Example 4. A vigorous agitation was provided. The following initial reactants were introduced into the reaction kettle, mixed, and heated to 31° C.:

| | Parts |
|---|---|
| Pigment dispersion F | 405 |
| Water | 250 |
| Cellosize WP-300 (3% aqueous solution) | 150 |
| Pluronic F68 | 18 |
| Pluronic L62 | 18 |
| Acrylonitrile (washed) | 48.4 |
| $Na_4P_2O_7$ | 0.3 |

To this mixture was added:

| | Parts |
|---|---|
| $K_2S_2O_8$ | 15 |
| Sodium formaldehyde sulfoxylate | 0.2 |
| Sodium hydrosulfite | 0.2 |
| $FeSO_4$ | 0.3 |

96.7 parts of delayed acrylonitrile was then run slowly in the reaction kettle together with 15 parts of $K_2S_2O_8$ 1.5% aqueous solution and 0.1 part of $FeSO_4$. The maximum temperature noted was 58° C. After all the monomer had been added and the temperature had subsided, 0.1 part each of $K_2S_2O_8$ and $FeSO_4$ was added. A good viscosity paint was thus obtained.

EXAMPLE 37

Example 37 was carried out in the apparatus of Example 4. A vigorous agitation was provided. The following ingredients were first mixed:

| | Parts |
|---|---|
| Pigment dispersion F | 405 |
| Water | 100 |
| Cellosize WP-300 (3% aqueous solution) | 150 |
| Pluronic F68 | 18 |
| Pluronic L62 | 18 |
| Styrene (washed) | 54.4 |

To this mixture was then added:

| | Parts |
|---|---|
| $K_2S_2O_8$ (1.5% aqueous solution) | 10 |
| Sodium formaldehyde sulfoxylate | 0.2 |
| Sodium hydrosulfite | 0.4 |
| $FeSO_4$ | 0.2 |
| Benzoyl peroxide | 0.1 |

This addition was followed by addition of delayed monomer and other ingredients as follows:

108.7 parts of delayed styrene was added together with sodium hydrosulfite (0.4 part), $K_2S_2O_8$ (0.2 part), $FeSO_4$ (0.2 part), benzoyl peroxide (0.1 part), and 1 part of 30% $H_2O_2$ aqueous solution, at a rate fast enough to keep the reaction going. The maximum temperature noted was 40° C. After this delayed addition was completed, 0.1 part each of $K_2S_2O_8$ and $FeSO_4$ was added. The run was completed in little more than one hour. A good viscosity paint was thus obtained.

EXAMPLE 38

Example 38 was carried out in the apparatus of Example 4. A vigorous agitation was provided. The following proportions of initial reactants were introduced into the reaction kettle, mixed, and heated to 30° C.:

| | Parts |
|---|---|
| Pigment dispersion F | 405 |
| Water | 100 |
| Cellosize WP-300 (3% aqueous solution) | 150 |
| Pluronic F68 | 18 |
| Pluronic L62 | 18 |
| Vinyl acetate | 56 |
| $Na_4P_2O_7$ | 0.3 |

To this mixture was added:

| | Parts |
|---|---|
| $K_2S_2O_8$ (1.5% aqueous solution) | 10 |
| Sodium formaldehyde sulfoxylate | 0.2 |
| $FeSO_4$ | 0.2 |

This addition was followed by addition of the delayed monomers and other ingredients as follows:

| | Parts |
|---|---|
| Vinyl acetate | 61.6 |
| Vinylidene chloride | 67.5 |
| $K_2S_2O_8$ (1.5% aqueous solution) | 20 |
| $FeSO_4$ | 0.1 |

The rate of addition of these last components was such that the reflux temperature of the reaction mixture was never attained but that the reaction was kept going. The maximum temperature attained was 46° C. After this last addition was completed, further amounts of catalytic agents were added as follows:

| | Parts |
|---|---|
| $K_2S_2O_8$ | 0.1 |
| Sodium hydrosulfite | 0.2 |
| $FeSO_4$ | 0.1 |

The paint thus obtained had a good viscosity. Film, leveling, and flexibility were rated as good.

EXAMPLE 39

Example 39 was carried out in the apparatus of Example 4. A vigorous agitation was provided. The following initial reactants were introduced into the reaction kettle:

| | Parts |
|---|---|
| Pigment dispersion F | 405 |
| Water | 100 |
| Cellosize WP–300 (3% aqueous solution) | 150 |
| Pluronic F68 | 18 |
| Pluronic L62 | 18 |
| Butyl acrylate (washed) | 53.6 |
| $Na_4P_2O_7$ | 0.3 |

These reactants were mixed and heated to 30° C. To this reaction mixture was added:

| | Parts |
|---|---|
| $K_2S_2O_8$ (1.5% aqueous solution) | 10 |
| Sodium formaldehyde sulfoxylate | 0.2 |
| Sodium hydrosulfite | 0.2 |
| $FeSO_4$ | 0.2 |

The delayed monomers were then added, while the temperature increased steadily up to 45° C., together with 20 parts of $K_2S_2O_8$ 1.5% aqueous solution and 0.2 part of sodium hydrosulfite. These delayed monomers consisted of:

| | Parts |
|---|---|
| Butyl acrylate (washed) | 42.9 |
| Vinylidene chloride (washed) | 90 |

At the very end of this delayed monomer addition, the temperature reached 51° C. After the temperature had subsided somewhat, 0.1 part each of $K_2S_2O_8$, $FeSO_4$, and sodium hydrosulfite were added. The paint thus obtained was rather thick. Film, leveling, and flexibility were good.

EXAMPLE 40

Example 40 was carried out in the apparatus of Example 4. The initial proportions of reactants were:

| | Parts |
|---|---|
| Pigment dispersion F | 405 |
| Water | 250 |
| Pluronic F68 | 26 |
| Methyl methacrylate (washed) | 56.2 |
| $Na_4P_2O_7$ | 0.3 |

These reactants were introduced into the reaction kettle, mixed and heated to 30° C. The following catalytic ingredients were then added:

| | Parts |
|---|---|
| $K_2S_2O_8$ (1.5% aqueous solution) | 10 |
| Sodium formaldehyde sulfoxylate | 0.2 |
| $FeSO_4$ | 0.2 |

112.3 parts of delayed methyl methacrylate (washed) were then added at a moderate rate. A high viscosity paint was thus obtained.

EXAMPLE 41

The following initial ingredients were introduced into a 200 cc. glass bottle and cooled to −25° C.

| | | |
|---|---|---|
| Pigment dispersion F | gm | 50.6 |
| Methocel 4000 (3% aqueous solution) | gm | 16.25 |
| Water | gm | 15.6 |
| Potassium oleate | gm | 0.6 |
| Sodium lauryl sulfate | gm | 0.25 |
| Styrene | gm | 16.25 |
| Hexanethiol | cc | 0.03 |

This was followed by the addition of the following ingredients at −25° C., after which the temperature of the sealed bottle was allowed to rise to room temperature.

| | | |
|---|---|---|
| Butadiene | gm | 9.0 |
| $FeSO_4$ | gm | 0.06 |
| Sodium hydrosulfite | gm | 0.08 |

The bottle was stopped with a neoprene-gasketed stopper and agitated on a mechanical shaker for one hour. 2 cc. of 1.5% aqueous solution of $K_2S_2O_8$ were added to the mixture through the stopper with a syringe. The reaction mixture was agitated for one more hour. 3 cc. of the aqueous solution of $K_2S_2O_8$ were added in the same way and the mixture agitated overnight. 0.06 gm. of sodium formaldehyde sulfoxylate was then added and the bottle agitated for one hour. The resulting product was a satisfactory latex paint from which a film was drawn. The paint film showed good leveling characteristics. The flexibility of the dried paint film was also good.

The present invention provides a rapid and economical method of preparing latex paints of the kind described whereby polymerization of the binder is effected at moderate temperatures below the reflux temperature of the polymerizing mixture, in presence of the pigment dispersion.

It is well known that the average size of the resin particles formed in emulsions decreases with the decreasing ratio of monomer to water during polymerization, and that the smaller the resin particles of a paint, the better are its qualities of pigment binding and gloss. Since in this invention the presence, during polymerization, of the water of the pigment dispersion and of the protective colloid solution reduces the ratio of monomer to water, the resultant paint has reduced average particle size and therefore improved pigment binding and gloss as compared with paints of the same resin content made by adding the pigment dispersion and the protective colloid solution after polymerization. It has been observed that an electron micrograph of a polyvinyl acetate paint prepared by the process of the invention showed that the particles of the resin had an average size of 0.1–0.2 micron whereas electron micrographs of latex paint prepared from a standard polyvinyl acetate emulsion by prior art methods showed an average particle size of 0.9–1.0 micron.

In prior art processes, two quantities of protective colloid are generally used, one to stabilize the emulsion from which the paint is prepared, the other one to stabilize the pigment in the paint. In the present process, emulsion polymerization is effected in presence of all paint ingredients and the protective colloid serves to stabilize both emulsion and pigment at the same time. In this way the proportion of protective colloid can be greatly reduced as compared to the proportion required in prior art processes. The protective colloid, at the same time as it stabilizes a paint, is known to reduce the water resistance of the paint film. It is therefore another advantage of the present invention that paint films having improved water resistance can be obtained.

From the foregoing description, it will be seen that the present invention provides a new process for preparing latex paints of improved gloss, water resistance, and binding power.

This application is a continuation-in-part of my application Serial Number 706,127, filed Dec. 30, 1957, now abandoned.

What is claimed is:

1. A process for preparing an aqueous pigmented coating composition having a pigment volume concentration of 8–80%, said process comprising:

(A) forming a mixture of
(1) water,
(2) a polymerizable constituent consisting essentially of a liquid selected from the group consisting of (a) vinyl esters of saturated aliphatic monocarboxylic acids having from two to four carbon atoms and mixtures of said vinyl esters,
(b) acrylic acid esters of saturated aliphatic monohydroxy alcohols having from one to four carbon atoms and mixtures of said acrylic acid esters,
(c) methacrylic acid esters of saturated aliphatic monohydroxy alcohols having from one to four carbon atoms and mixtures of said methacrylic acid esters,
(d) acrylonitrile,
(e) styrene,
(f) mixtures of any one of said vinyl esters and any one of said acrylic acid esters,
(g) mixtures of any one of said vinyl esters and a vinyl ester of saturated aliphatic monocarboxylic acids having from five to eight carbon atoms,
(h) mixtures of any one of said vinyl esters of acids having from two to four carbon atoms and an acrylic acid ester of saturated aliphatic monohydroxy alcohols having from five to ten carbon atoms,
(i) mixtures of any one of said acrylic acid esters of alcohols having from one to four carbon atoms and an acrylic acid ester of saturated aliphatic monohydroxy alcohols having from five to ten carbon atoms,
(j) mixtures of any one of said methacrylic acid esters of alcohols having from one to four carbon atoms and any one of the aforesaid vinyl esters,
(k) mixtures of any one of said methacrylic acid esters of alcohols having from one to four carbon atoms and any one of the aforesaid acrylic acid esters,
(l) mixtures of acrylonitrile and any one of the aforesaid acrylic acid esters,
(m) mixtures of vinylidene chloride and any one of the aforesaid vinyl esters,
(n) mixtures of vinylidene chloride and any one of the aforesaid acrylic acid esters,
(o) mixtures of a maleic acid diester of saturated aliphatic monohydroxy alcohols having from one to ten carbon atoms and any one of the said vinyl esters of acids having from two to four carbon atoms,
(p) mixtures of one of said maleic acid diesters and any one of said acrylic acid esters of alcohols having from one to four carbon atoms,
(q) mixtures of a fumaric acid diester of saturated aliphatic monohydroxy alcohols having from one to ten carbon atoms and any one of said vinyl esters of acids having from two to four carbon atoms,
(r) mixtures of any one of said fumaric acid diesters and any one of said acrylic acid esters of alcohols having from one to four carbon atoms, and
(s) mixtures of styrene and butadiene,
(3) an aqueous pigment dispersion,
(4) a wetting agent,
(5) a protective colloid,
(6) a reduction activated catalyst system consisting of
(a) an oxidizing agent consisting of a water-soluble salt of persulfuric acid,
(b) at least one reducing agent consisting of a water-soluble compound of the group consisting of salts of oxyacids of sulfur having reducing properties and addition compounds of these salts with an aldehyde,
(c) a catalyst activator consisting of a water-soluble iron salt in an amount of at least 0.0023% by weight of the polymerizable constituent when said salt is ferrous sulfate and at least an equimolar equivalent of such amount when other iron salt is used, and
(d) a sequestering agent capable of forming a complex with polyvalent iron cations, the molar ratio of sequestering agent to iron cation being in the range from 1:2 to 2:1,
(B) agitating said mixture at temperatures below the refluxing temperature of the mixture while polymerization of said polymerizable constituent and dispersion of the pigment in the resulting emulsion occur simultaneously, and
(C) adjusting the proportion of polymerizable constituent in the mixture to form an aqueous pigmented coating composition having a pigment volume concentration of between 8 and 80%.

2. A process as claimed in claim 1, in which the polymerizable constituent consists of vinyl acetate.

3. A process as claimed in claim 2, in which the wetting agent is the condensation product of ethylene oxide with the reaction product of propylene oxide and propylene glycol, said condensation product having an average molecular weight of between 2,000 and 8,000, the protective colloid is hydroxyethyl cellulose, and the catalyst system consists of potassium persulfate, sodium formaldehyde sulfoxylate, ferrous sulfate, and sodium pyrophosphate.

4. A process as claimed in claim 2, in which the catalyst activator is selected from the group of iron salts consisting of ferric chloride and ferrous sulfate.

5. A process as claimed in claim 1, in which the sequestering agent is an alkali metal salt selected from the group consisting of sodium silicate, potassium silicate, sodium pyrophosphate, potassium pyrophosphate, sodium metaphosphate, and potassium metaphosphate.

6. A process as claimed in claim 5, further comprising adding a plasticizer for the polymerized material on completion of the polymerization.

7. A process as claimed in claim 1, in which said polymerizable constituent is added in two portions, the second portion between 70 and 30% of the total polymerizable constituent by weight, at temperatures below the refluxing temperature of the mixture, said second portion being adjusted to form an aqueous pigmented coating composition having a pigment volume concentration of between 8 and 80%.

8. A process as claimed in claim 7, in which the oxidizing agent and the reducing agent are added in two portions, the second portions of these oxidizing and reducing agents being added after all of the polymerizable constituent has been added, said second portion of oxidizing agent ranging between 50 and 20% of the total oxidizing agent by weight, and said second portion of reducing agent ranging between 50 and 0% of the total reducing agent by weight.

9. A process as claimed in claim 1, in which the reducing agent is a water-soluble compound selected from the group consisting of sulfoxylates, sulfites, hydrosulfites, bisulfites, and metabisulfites.

10. A process for preparing an aqueous pigmented coating composition, said process comprising (A) forming a mixture of (1) water, (2) a polymerizable liquid comprising a vinyl ester of a saturated aliphatic monocarboxylic acid having from two to four carbon atoms, (3) an aqueous pigment dispersion, (4) a wetting agent of the group consisting of anionic and non-ionic wetting agents, (5) a protective colloid, (6) a reduction activated catalyst system consisting of (a) an oxidizing agent consisting of a water-soluble salt of persulfuric acid, (b) a reducing agent consisting of a water-soluble compound selected from the group consisting of salts of oxy-acids of sulfur having reducing properties and addition compounds of these salts with an aldehyde, (c) a catalyst activator consisting of a water-soluble iron salt in an amount of at least 0.0023% by weight of the polymerizable liquid when said salt is ferrous sulfate and at least an equimolar equivalent of such amount when other iron salt is used, and (d) a sequestering agent capable of forming a complex with polyvalent iron cations, the molar ratio of sequestering agent to iron cation being in the range from 1:2 to 2:1, (B) agitating said mixture at temperatures below the reflux temperature of the mixture to form an aqueous emulsion while polymerization of said monomer in water and dispersion of the pigment in said emulsion occur simultaneously, the proportion of polymerizable liquid in the mixture forming an aqueous pigmented coating composition having a pigment volume concentration of between about 25 and about 40%.

11. A process as claimed in claim 10, in which the sequestering agent is selected from the group consisting of sodium silicate, potassium silicate, sodium pyrophosphate, potassium pyrophosphate, sodium metaphosphate, and potassium metaphosphate.

12. A process as claimed in claim 11, in which the protective colloid is selected from the group consisting of methyl cellulose and hydroxyethyl cellulose.

13. A process as claimed in claim 12, in which the activator is selected from the group of iron salts consisting of ferric chloride and ferrous sulfate.

14. A process as claimed in claim 10, further comprising adding a plasticizer at the end of the agitation period.

15. A process as claimed in claim 14, in which said plasticizer is dibutyl phthalate.

16. A process as claimed in claim 10, in which the reducing agent is a water-soluble compound selected from the group consisting of sulfoxylates, sulfites, hydrosulfites, bisulfites, and metabisulfites.

17. A process as claimed in claim 10, in which said polymerizable liquid contains, in addition to the vinyl ester, at least one other unsaturated aliphatic compound copolymerizable therewith and selected from the group consisting of acrylic acid esters, methacrylic acid esters, maleic acid diesters, and fumaric acid diesters, all of these esters being esters of saturated aliphatic alcohols having from one to ten carbon atoms, and vinyl esters of saturated aliphatic monocarboxylic acids having from two to eight carbon atoms.

18. A process for preparing an aqueous pigmented coating composition, said process comprising (A) forming a mixture of (1) water, (2) a polymerizable liquid comprising vinyl acetate, (3) a previously prepared uniform paste containing pigment material, a dispersing aid, and water, (4) a wetting and sequestering agent consisting of a high molecular weight condensation product of ethylene oxide with the reaction product of propylene oxide with propylene glycol, (5) a protective colloid consisting of hydroxyethyl cellulose, (6) a reduction activated catalyst system consisting of potassium persulfate, sodium formaldehyde sulfoxylate, and ferrous sulfate in an amount of at least 0.0023% by weight of the polymerizable liquid, the molar ratio of the wetting and sequestering agent to ferrous sulfate being in the range from 1:2 to 2:1, (B) agitating said mixture at temperatures below the reflux temperature of the mixture to form an emulsion while polymerization of said vinyl acetate in water and dispersion of the pigment in said emulsion occur simultaneously, the proportion of polymerizable liquid in the mixture forming an aqueous pigmented coating composition having a pigment volume concentration of between about 25 and about 40%.

19. A process for preparing an aqueous pigmented coating composition, said process comprising (A) forming a mixture of (1) water, (2) a polymerizable liquid comprising vinyl acetate, (3) a previously prepared uniform paste containing pigment material, a dispersing aid, and water, (4) a wetting agent consisting of an alkyl aryl sodium sulfonate, (5) a protective colloid consisting of hydroxyethyl cellulose, (6) a reduction activated catalyst system consisting of potassium persulfate, sodium formaldehyde sulfoxylate, ferrous sulfate in an amount of at least 0.0023% by weight of the polymerizable liquid, and sodium pyrophosphate, the molar ratio of sodium pyrophosphate to ferrous sulfate being in the range from 1:2 to 2:1, (B) agitating said mixture at temperatures below the reflux temperature of the mixture to form an emulsion while polymerization of said vinyl acetate in water and dispersion of the pigment in said emulsion occur simultaneously, the proportion of polymerizable liquid in the mixture forming an aqueous pigmented coating composition having a pigment volume concentration of between about 25 and about 40%.

20. A process for preparing an aqueous pigmented coating composition, said process comprising (A) forming a mixture of (1) water, (2) a first portion of a polymerizable liquid comprising a monomeric vinyl ester of a saturated aliphatic monocarboxylic acid having from two to four carbon atoms, (3) an aqueous pigment dispersion, (4) a wetting agent of the group consisting of anionic and non-ionic wetting agents, (5) a protective colloid, (6) a reduction activated catalyst system consisting of ($a$) a first portion of an oxidizing agent consisting of a water-soluble salt of persulfuric acid, ($b$) a first portion of a reducing agent consisting of a water-soluble compound selected from the group consisting of salts of oxy-acids of sulfur having reducing properties and addition compounds of these salts with an aldehyde, ($c$) a catalyst activator consisting of a water-soluble iron salt in an amount of at least 0.0023% by weight of the polymerizable liquid when said salt is ferrous sulfate and at least an equimolar equivalent of such amount when other iron salt is used, and ($d$) a sequestering agent capable of forming a complex with polyvalent iron cations, the molar ratio of sequestering agent to iron cation being in the range from 1:2 to 2:1, (B) agitating said mixture at temperatures below the reflux temperature of the mixture to form an emulsion-dispersion of the liquids and solids while polymerization proceeds, (C) while continuing the agitation, adding a second portion of the polymerizable liquid ranging between 70% and 30% of the total amount of polymerizable liquid by weight, at a rate to preclude the temperature of the reaction mixture from rising to the reflux temperature and in an amount to form an aqueous pigmented coating composition having a pigment volume concentration of between about 25 and about 40%, (D) while continuing the agitation after all of the polymerizable liquid has been added, adding a second portion of the oxidizing agent ranging between 50% and 20% of the total amount of oxidizing agent by weight, and a second portion of the reducing agent ranging between 50% and 0% of the total amount of reducing agent by weight, (E) continuing the agitation until polymerization of the said monomer in water and dispersion of the pigment in said emulsion are completed, whereby a pigmented coating composition is produced.

References Cited in the file of this patent

UNITED STATES PATENTS

| | | |
|---|---|---|
| 2,161,481 | Marks | June 6, 1939 |
| 2,560,741 | Provost | July 17, 1951 |
| 2,875,166 | Hopkins | Feb. 24, 1959 |
| 2,883,304 | Kine et al. | Apr. 21, 1959 |

FOREIGN PATENTS

| | | |
|---|---|---|
| 689,400 | Great Britain | Mar. 25, 1953 |

OTHER REFERENCES

Tapp: "Chemistry in Canada," April 1950, volume 2, No. 4, pages 21–24.

UNITED STATES PATENT OFFICE
CERTIFICATE OF CORRECTION

Patent No. 3,054,762                        September 18, 1962

Richard W. Rees

It is hereby certified that error appears in the above numbered patent requiring correction and that the said Letters Patent should read as corrected below.

In the heading to the printed specification, lines 2 to 4, title of invention, for "PROCESS FOR PREPARING EMULSION PAINTS BY POLYMERIZING MONOMER IN PRESENCE OF MONOMER" read -- PROCESS FOR PREPARING EMULSION PAINTS BY POLYMERIZING MONOMER IN PRESENCE OF PIGMENT --; column 6, line 59, for "lease" read -- least --; column 16, line 68, for "Vinvyl" read -- Vinyl --.

Signed and sealed this 26th day of February 1963.

(SEAL)
Attest:

ESTON G. JOHNSON                              DAVID L. LADD
Attesting Officer                                Commissioner of Patents